United States Patent [19]
Tobita

[11] Patent Number: 5,938,730
[45] Date of Patent: Aug. 17, 1999

[54] METHOD OF MANAGING SOFTWARE BY TRANSMITTED DATA ON NETWORK

[75] Inventor: Masahiro Tobita, Hokkaido, Japan

[73] Assignee: Hudson Soft Co., Ltd., Hokkaido, Japan

[21] Appl. No.: 08/780,924

[22] Filed: Jan. 9, 1997

[30] Foreign Application Priority Data

Jan. 12, 1996 [JP] Japan .................................. 8-020709

[51] Int. Cl.$^6$ ................................................. G06F 13/00
[52] U.S. Cl. .......................................................... 709/224
[58] Field of Search ..................... 364/DIG. 1 MS File, 364/DIG. 2 MS File; 395/182.16, 186, 200.54, 200.59, 652, 653, 712; 705/1, 22, 26, 32, 500; 714/18; 713/200, 2, 100; 709/224, 229

[56] References Cited

U.S. PATENT DOCUMENTS 5,649,187 7/1997 Hornbuckle ........................ 395/200.54

FOREIGN PATENT DOCUMENTS

0653695A2 11/1994 European Pat. Off. .
95/34857 12/1995 WIPO .

*Primary Examiner*—Robert B. Harrell
*Attorney, Agent, or Firm*—McDermott, Will & Emery

[57] ABSTRACT

An user buys a software having a product code stored in a CD-ROM. An use-charge of the software is paid. The use-charge is determined by the user in correspondence with an use frequency of the software before the software is used. When the use-charge of the software is paid, the key code management table in a host computer are updated. The user's computer is connected with the host computer on a network, then the user gets an usable time and a key code of the software. Thus, the user can use the software within the usable time corresponding with the use-charge. Therefore, the use-charge and a public network fee can be collected reliably.

4 Claims, 5 Drawing Sheets

FIG.2

| KEY CODE MANAGEMENT TABLE (A) | | | | | | |
|---|---|---|---|---|---|---|
| PRODUCT CODE | SENDING SIGN | PAID USE-CHARGE | PAYING DATE | SENDING DATE | OTHERS | |
| XXXXX | X | XX,XXX,XXX,XXX | XX XX XX XX | XX XX XX XX | | |
| ⋮ | ⋮ | ⋮ | ⋮ | | | |

METHOD OF MANAGING SOFTWARE BY TRANSMITTED DATA ON NETWORK

FIELD OF THE INVENTION

The invention relates to a method of managing a software, and more particularly, to a method of managing a software by transmitted data on a network, the data is processed in a computer system such as a home game apparatus or a personal computer (PC) by said software.

BACKGROUND OF THE INVENTION

A conventional home game apparatus comprises a game unit and a ROM cartridge. The game unit has a CPU (Central Processing Unit), a RAM (Random Access Memory), a ROM (Read-Only Memory), I/O (Input/Output) interfaces, and a timer. The ROM cartridge has an I/O interface and a ROM. The game unit and the ROM cartridge are connected with each other through the each I/O interface.

Now, a home game apparatus includes a communication unit such as a card type modem and a RTC (Real Time Clock). The home game apparatus can be connected with a network by the card type modem. Further, an use time of a computer game can be calculated by the RTC, because the RTC is an IC (Integrated Circuit) having a clock function and a calendar function.

A computer game program may be provided as data stared in a ROM cartridge or a CD-ROM. A user buys the ROM cartridge or the CD-ROM which includes a computer game program. The user plays the computer game stored in the ROM cartridge or the CD-ROM. Further, a computer game program may be provided as data on a network. A user may buy the computer game program on the network by using the card type modem. Then, the computer game may be played on the network by the card type modem.

On the other hand, a PC (Personal Computer) generally includes a CPU, a RAM, a ROM, I/O Interfaces, a floppy disk unit, a CD-ROM driver a time/clock function, and a modem. Then, an use time of a software can be calculated by the time/clock function. The PC can be connected with a network by the modem.

A software such as an operation program or a computer game program may be provided as data stored in a CD-ROM or floppy disks. A user buys the CD-ROM or the floppy disks which includes the software. The user uses the software stored in the CD-ROM or floppy disks Further, when the PC can be connected with a network by the modem, a software may be provided as data on the network. The software can be bought online on the network and then downloaded online into the PC on the network.

In the conventional method of managing a software on a network, generally, a purchase price or an use-charge of a software is collected with a public network fee. A data provider (a sender) sends an user (a receiver) data such as an accounting code of a software. Then, the user can use the software by the received data. When the user uses the software, a software use frequency, called generally a data use frequency, is stored with the accounting code. Then, the data provider collects a data (software) use-charge and a public network fee in correspondence with the data use frequency and the accounting code.

In the conventional method of managing a software on a network, however, there are disadvantages in that a data use-charge and a public network fee may not be collected because the data use-charge and the public network fee are paid after an user used the data and the network, and data such as a software or a computer game program can not rent with a term of a lease thereof on a network because the data is owned by a user if once the user downloads the data on the network.

SUMMARY OF THE INVENTION

Accordingly, it is an object of the invention to provide a method of managing a software by transmitted data on a network in which a data use-charge and a public network fee can be collected reliably.

Accordingly, it is another object of the invention to provide a method of managing a software by transmitted data on a network in which the software such as an operation program or a computer game can rent with a term of a lease thereof on the network.

According to the feature of the invention, a method of managing a software by transmitted data on a network between a host computer and one or more personal computers comprises the steps of loading a software into a personal computer, the software includes a main program, a communication program for transmitting data on the network between the host computer and the personal computer, and a time managing program for managing an usable time of the main program, requiring the usable time and a key code for operating the main program from the personal computer to the host computer by the communication program, receiving the key code and the usable time by the communication program, operating the main program within the usable time by using the key code, and managing the usable time of the main program by the time managing program.

BRIEF DESCRIPTION OF THE DRAWINGS

The invention will be described in more detail in conjunction with the accompanying drawings, wherein:

FIG. 2 is a block diagram of a key code management table in a host computer of the present invention;

DETAILED DESCRIPTION OF THE PREFERRED EMBODIMENTS

Figure 1:
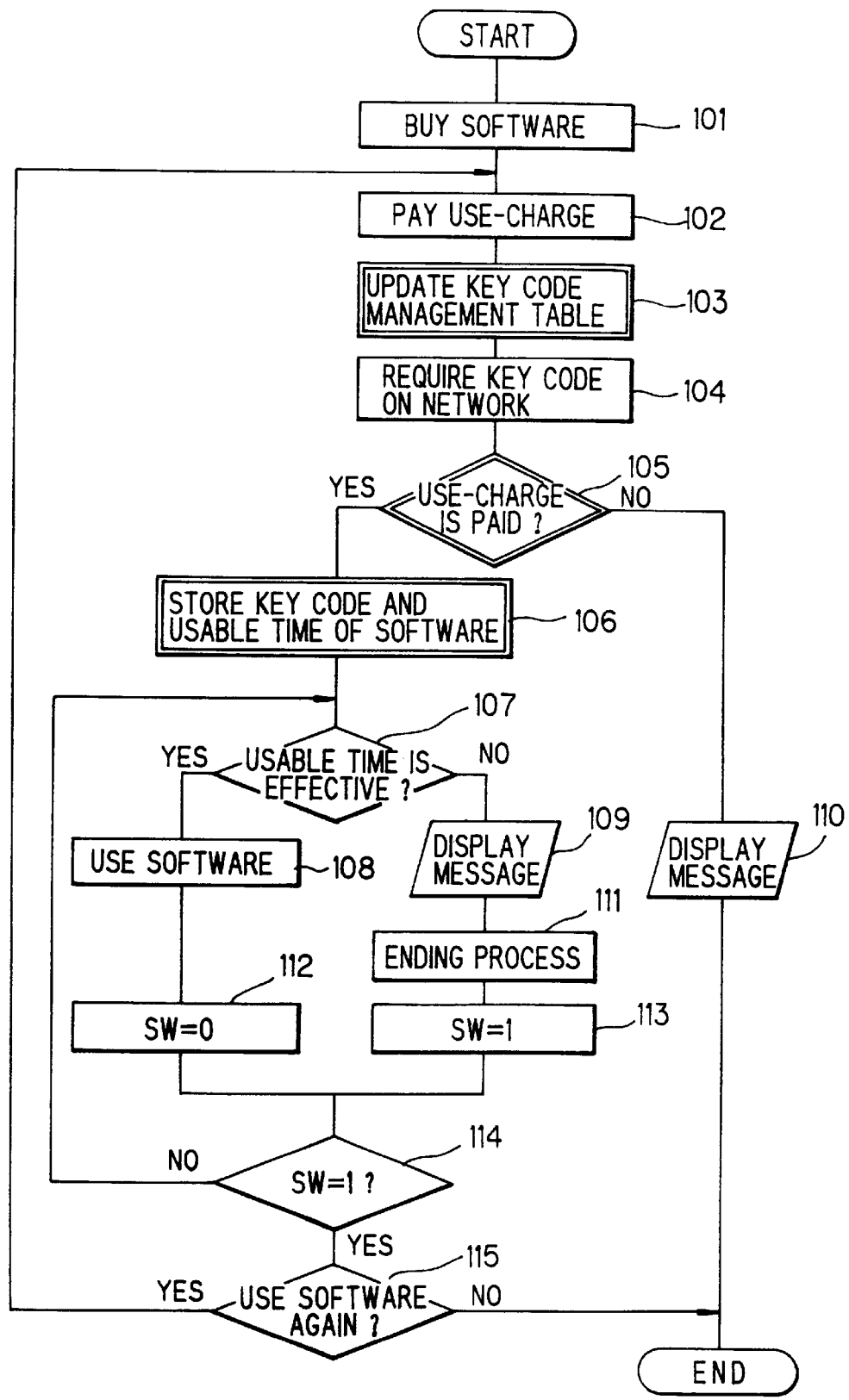
FIG. 1 is a flow chart of processing a method of managing a software by transmitted data on a network of the present invention.

Before explaining a method of managing a software by transmitted data on a network in the preferred embodiment according to the invention, the above mentioned conventional method of managing a software on network will be explained.

A conventional home game apparatus comprises a game unit and a ROM cartridge. The game unit has a CPU (Central Processing Unit) for processing a program of a computer game and an operation system, a RAM (Random Access Memory) for storing the program of the computer game, a ROM (Read-Only Memory) for storing the operation system, I/O (Input/Output) interfaces for connecting with the ROM cartridge and a home-television, and a timer for calculating an elapsed time of the computer game. The ROM cartridge has an I/O interface for connecting with the game unit, and a ROM for storing the program of the computer game. The game unit and the ROM cartridge are connected with each other through the each I/O interface.

Now, a home game apparatus includes a communication unit such as a card type modem and a RTC (Real Time Clock). The home game apparatus can be connected with a network by the card type modem which can be included therein. Further, an use time of a computer game can be calculated by the RTC, because the RTC is an IC (Integrated Circuit) having a clock function and a calendar function. Namely, the RTC calculates year, month, day, day of the week, hour, minute, and second of the time of the computer game by using the clock function and the calendar function.

A computer game program may be provided as data stored in a ROM cartridge or a CD-ROM. A user buys the ROM cartridge or the CD-ROM which includes a computer game program. The user plays the computer game stored in the ROM cartridge or the CD-ROM. Further, a computer game program may be provided as data on a network. A user may buy the computer game program on the network by using the card type modem. Then, the computer game may be played online on the network by the card type modem.

On the other hand, a PC (Personal Computer) generally includes a CPU for processing a software, a RAM (Random Access Memory) for storing the software, a ROM (Read-Only Memory) for staring an operation system, I/O (Input/Output) interfaces for connecting with external units, a floppy disk unit for driving a floppy disk including data such as a software, a CD-ROM (Compact Disk Read-Only Memory) drive for driving a CD-ROM including data such as a software, a time/clock function for controlling time of a hardware and a software in the PC, and a modem for connecting with network and communicating with other computers on the network. Then, an use time of data such as a software can be calculated by the time/clock function.

A software such as an operation program or a computer game program may be provided as data stored in a CD-ROM or floppy disks. A user buys the CD-ROM or the floppy disks which includes the software. The user uses the software stored in the CD-ROM or floppy disks. Further, when the PC can be connected with a network by the modem, a software may be provided as data on the network. The software can be bought online on the network and then downloaded online into the PC on the network.

In the conventional method of managing a software on a network, generally, a purchase price or an use-charge of data such as a software is collected with a public network fee. For example, in an information communication network, a data provider (a sender) sends an user (a receiver) data such as an accounting code of a software. Than, the user can use the software by the received data. When the user uses the software, a software use frequency, called generally a data use frequency, is stored with the accounting code. Then, the data provider collects a data (software) use-charge and a public network fee in correspondence with the data use frequency and the accounting code.

In the conventional method of managing a software on a network, however, there are disadvantages in that a data use-charge and a public network fee may not be collected because the data use-charge and the public network fee are paid after an user used the data and the network, and data such as a software or a computer game program can not rent with a term of a lease thereof on a network because the data is owned by a user if once the user downloads the data on the network.

Therefore, it is need to provide a method of managing a software on a network in which a data use-charge and a public network fee can be collected reliably, and data such as a software can rent with a term of a lease thereof on the network.

Next, a method of managing a software by transmitted data on a network in the first preferred embodiment according to the invention will be explained in FIGS. 1 and 2.

FIG. 1 is a flow chart of processing a method of managing a software by transmitted data on a network of the present invention. In FIG. 1, an user may buy a software including a product code stored in a CD-ROM, floppy disks, or a ROM cartridge at the step 101. Further, the user may buy a software including a product code on a network. Then, an use-charge of the software is paid at the step 102. The use-charge is determined by the user in correspondence with an use frequency of the software before the software is used. When the use-charge of the software is paid, the product code must be informed a software provider (a host computer center).

The host computer has a key code management table. FIG. 2 is a block diagram of a key code management table in a host computer of the present invention. The key code management table includes fields of a product code, a sending sign, a paid use-charge, a paying date, a sending date, and other. When the use-charge of the software and the product code are received by the host computer, the field of the sending sign in the key code management table is cleared, and, at the same time, the fields of the product code, the paid use-charge and the paying date in the key code management table are updated at the step 103 in FIG. 1. In this case, a password may be added to the product code.

An user's computer such as a PC or a home game apparatus is connected with the host computer on the network, then the user requires that the host computer sends the user's computer the key code of the software at the step 104. The sending sign field of the key code management table is updated (for example, changed from "0" to "1") when the key code of the software is sent to the user's computer. After the key code of the software is sent to the user's computer, the software is able to be used.

When the request of sending the key code is received by the host computer, the sending code field and the paying date field are confirmed at the step 105. If the sending coda field is "0" and the paying date is not "0", namely, if the user paid the use-charge and did not receive the key code of the software yet, the key code and an usable time of the software in correspondence with the paid use-charge are sent to the user's computer. If the user did not pay the use-charge of the software or the key code of the software already sent to the user's computer, the message is displayed on a monitor of the user's computer at the step 110, and then this process is ended.

When the key code and the usable time of the software are received by the user's computer, the key code and the usable time of the software are stored in a storage of the user's computer at the step 106. The software confirms whether the usable time is effective or not at the step 107. IF the usable time is effective, the software is able to be used within the usable time of the software at the step 108. Then, an effective switch is set an "0" at the step 112. Next, at the step 114, if the effective switch is not "1", the step 107 returns. Then, the steps 107 to 114 are repeated on a predetermined cycle Until the usable time is over.

If the usable time is over, the message of "THE USABLE TIME IS OVER" is displayed on a monitor of the user's computer at the step 109. Then, an ending process of the software is executed automatically at the step 111. The data of the software is saved at the ending process. At the step 113, the effective switch is set on "1". At the step 114, it is confirmed that the effective switch is "1", the step 115 follows. At the step 115, if the software is need to be used again, the step 102 returns. If the software is not need to be used again, she process is ended.

Next, a method of managing a software by Transmitted data on a network in the second preferred embodiment according to the invention will be explained in FIGS. 3 to 5.

Figure 3:
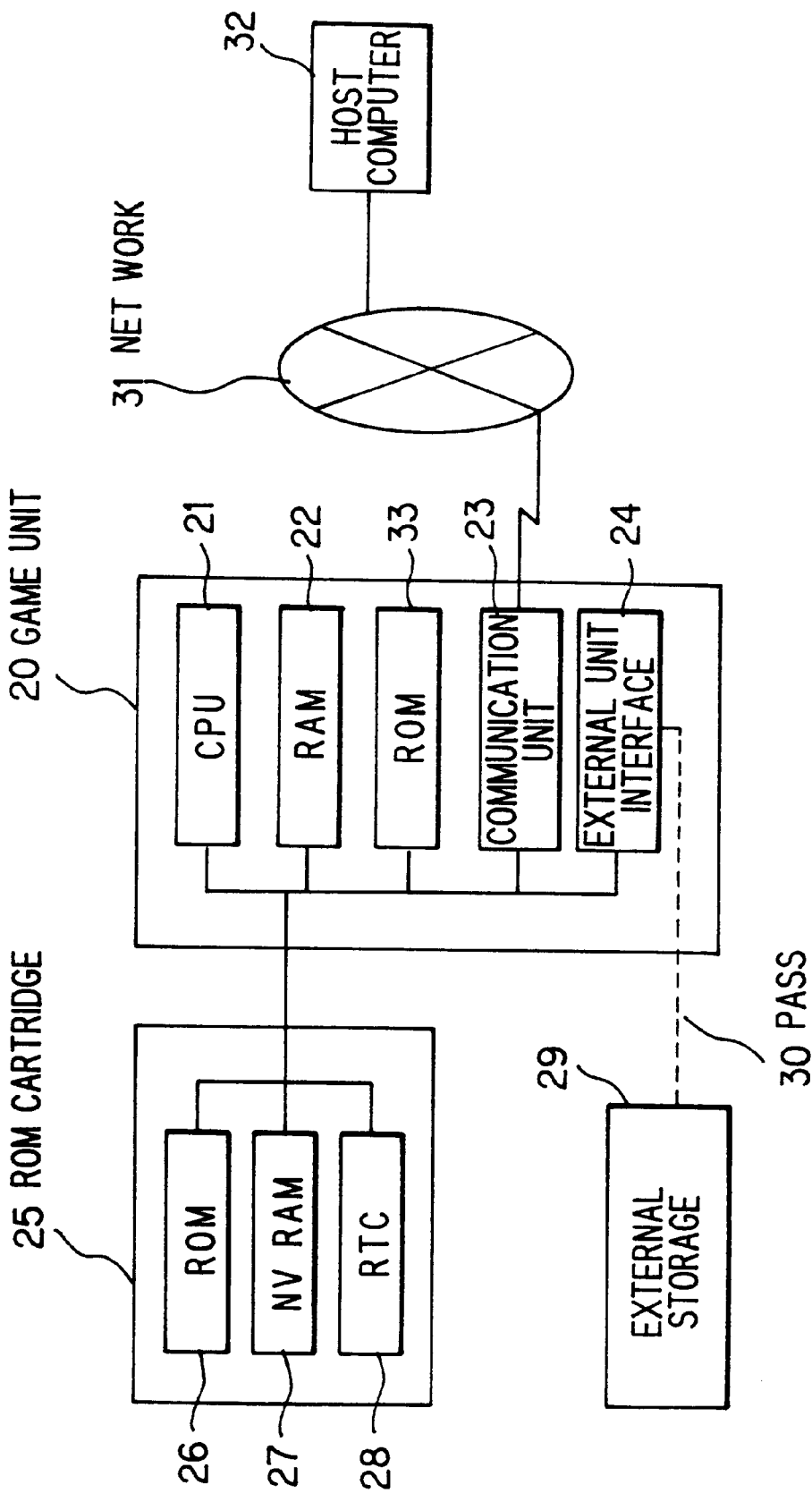
FIG. 3 is a block diagram of a home game apparatus of the present invention.

FIG. 3 is a block diagram of a home game apparatus of the present invention.

A home gaze apparatus comprises a game unit 20, a ROM cartridge 25, and an external storage 29 for storing a computer game program and data of the computer game. The game unit 20 has a CPU 21 for processing a program of a computer game and an operation system, a RAM 22 for storing the program of the computer game, a ROM 33 for storing the operation system, I/O (Input/Output) interfaces (not shown) for connecting with the ROM cartridge 25 and a home-television (not shown), a communication unit 23 for communicating with a host computer 32 on a network 31, and an external unit interface 24 for connecting with an external unit such as the external storage 29. The external storage 29 is connected with the game unit 20 by a pass 30 via the external unit interface 24. In the game unit 20, the CPU 21, the ROM 33, the RAM 22, the communication unit 23, and the external unit interface 24 are connected with each other. The RAM 22 is used as a main memory by the CPU 21. Further, the game unit 20 is connected with the host computer 32 on the network 31 by the communication unit 23. Therefore, data including a key code and an usable time of the computer game is able to be transmitted between the game unit 29 and the host computer 32 on the network 31.

The ROM cartridge 25 has an I/O interface (not shown) for connecting with the game unit 20, a ROM 26 for storing the computer game program, a NV (Non-Volatile) RAM 27, and RTC (Real Time Clock) 28. The game unit 20 and the ROM cartridge 25 are connected with each other through the each I/O interface.

In the ROM cartridge 25, the ROM 26 is for storing a computer game program. The NV RAM 27 is for storing the key code and the usable time of the computer game which are received by the communication unit 23 in the game unit 20. The RTC 28 is an rc (Integrated Circuit) having a clock function and a calendar function. The received usable time of the computer game is calculated based on a real time by the clock function and the calendar function in the RTC 28, Namely, if "T1" is the usable time of the computer game and "T2" is the use time of the computer game, the RTC 28 calculates a remainder ("T1–T2") of the usable time of the computer game by using the clock function and the calendar function. Further, the RTC 28 and the NV RAM 27 are connected with a battery (not shown). The RTC 28 and the NV RAM 27 are supplied with a power by the battery. Therefore, if the ROM cartridge 25 is detached from the game unit 20, the RTC 28 and the NV RAM 27 correctly saves the remainder of the usable time of the computer game therein independent of the game unit 20.

On the other hand, a PC (Personal Computer) generally includes a CPU for operating softwares such as a computer game and an operation system, a RAM (Random Access Memory) for storing the softwares, a ROM (Read-Only Memory) for storing an operation system, I/O (Input/Output) interfaces for connecting with external units, a floppy disk unit for driving floppy disks including data such as a software, a CD-ROM (Compact Disk Read-Only Memory) drive for driving a CD-ROM including data such as a software, a time/clock function for controlling time of the hardware and/or the software in the PC, and a modem for connecting with a network and for communicating with other computers on the network. Further, an use time of data such as a software can be calculated by the time/clock function.

A software such as a computer game is provided as data stored in a CD-ROM. In this case, the usable time and the key code of the software is controlled by a time management program which is included in the CD-ROM (the software). FIG. 4 is a flow chart of a process of a time management program. FIG. 5 is a block diagram of a file in a CD-ROM used in FIG. 4.

Figure 4:
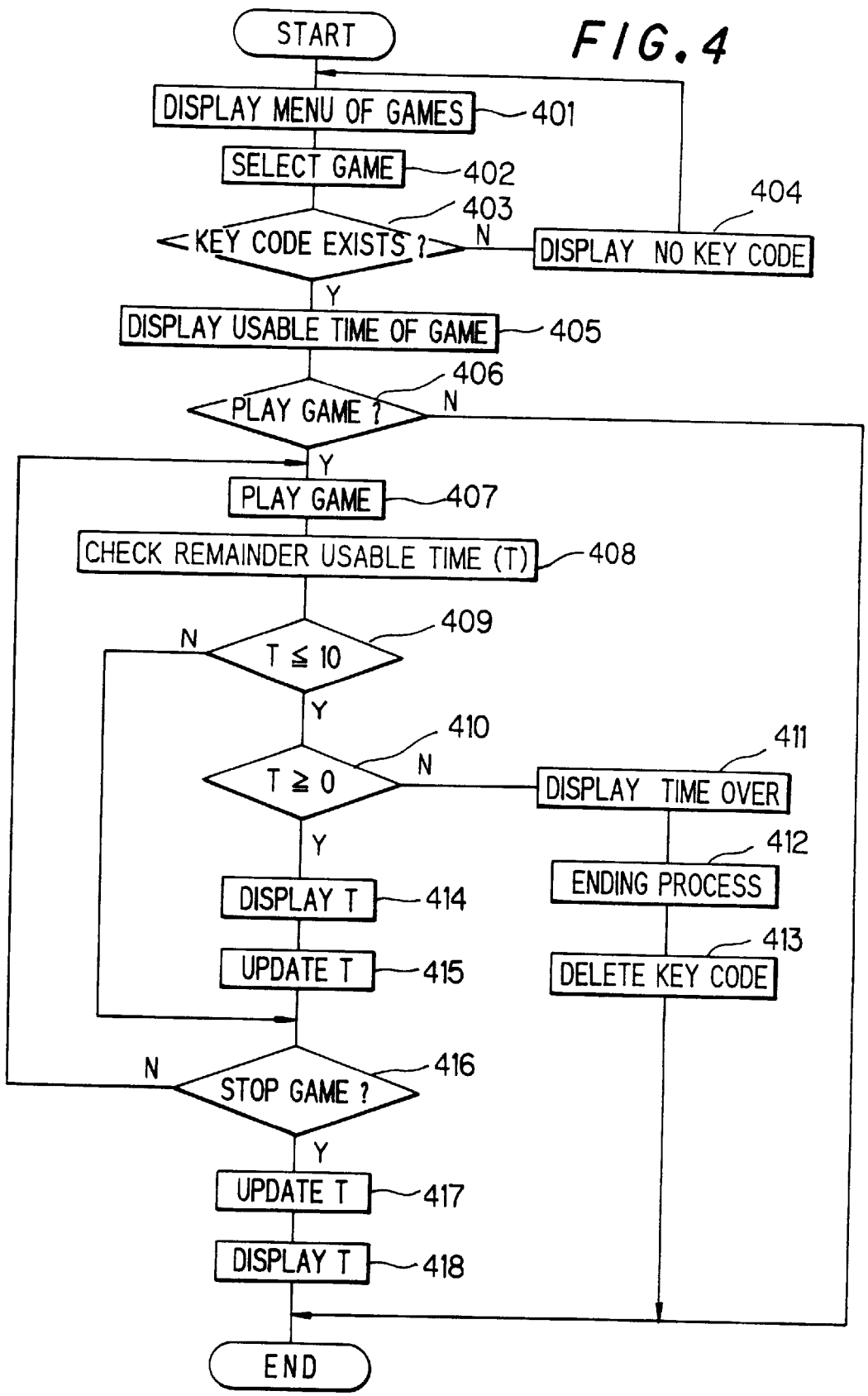
FIG. 4 is a flow chart of a process of a time management program.
Figure 5:
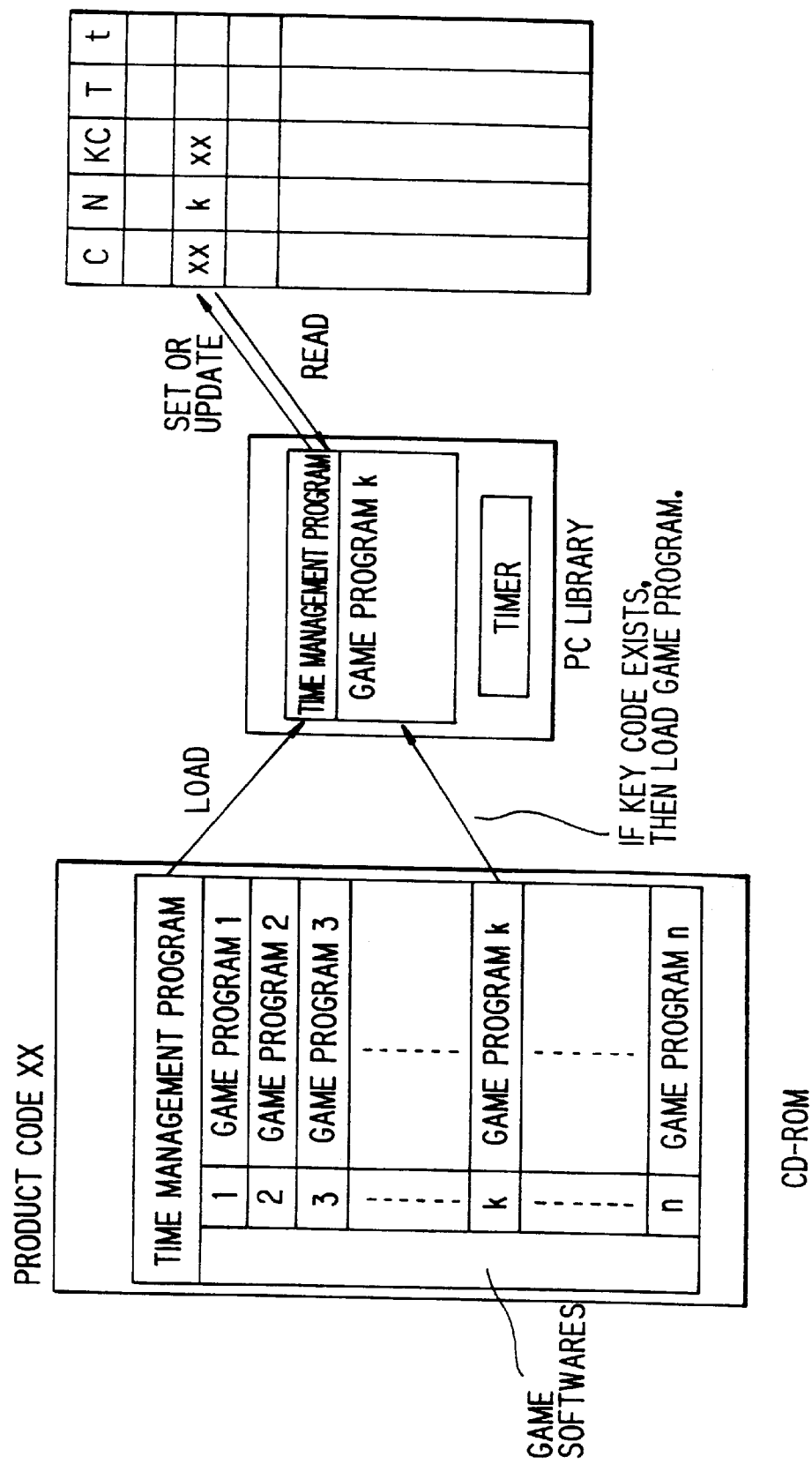
FIG. 5 is a block diagram of a file in a CD-ROM used in FIG. 4.

In FIG. 4, a menu of computer games is displayed on a display unit at the step 401. One of the computer games is selected by an user at the step 402. At the step 403, a key code or the selected computer game is checked. If the key code dose not exist, the message of "NO KEY CODE" is displayed at the step 404, then the step 401 returns. If the key code exists, an usable time of the computer game is displayed on the display unit at the step 405. At the step 406, the user selects whether the computer game is played or not. If the user selects the playing game, the computer game is played at the step 407. During playing the computer game, the remainder usable time is checked on a predetermined cycle at the step 408. At the step 409, if the remainder usable time is more than "10 minutes", the step 416 follows. If the remainder usable time is less than "10 minutes", the step 410 follows. At the step 410, if the remainder usable time is less than "0", the message of "TIME IS OVER" is displayed on the display unit at the step 411. Then, the ending process of the computer game is executed at the step 412. At the ending process, the data of the computer game such as a status of a game character is saved. The key code of the computer game is deleted automatically by the time management program at the step 413. If the remainder usable time is more than "0" at the step 410, the remainder usable time is displayed on the display unit during playing the computer game at the step 414. Next, the remainder usable time is updated at the step 415. The steps 407 to 415 are repeated until the user steps the computer game at the step 416 or the remainder usable time becomes less than "0" at the step 410. If the user stops the computer game at the step 416, the remainder usable time is updated as a new usable time at the step 417. Next, the new usable time is displayed on the display unit at the step 418, then the time management process is ended.

Therefore, a data use-charge and a public network. fee can be collected reliably. Further, a software such as a computer game can rent with a term of a lease thereof on a network.

As this invention may be embodied in several forms without departing from the sprit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. A method of managing a software by transmitted data on a network between a host computer and one or more personal computers, comprising the steps of:

connecting a recording medium to said personal computer, said recording medium storing a software which includes a main program, and a time managing program for managing an usable time of said main program;

loading said main program and said time managing program from said recording medium to said personal computer;

requesting a key code from said personal computer via said network to said host computer, said key code making possible for said personal computer to use said main program for said usable time;

receiving said key code at said personal computer via said network from said host computer; and using said main program at said personal computer in accordance with said key code received for a time duration less than or equal to said usable time managed by said time managing program.

2. The method of claim 1, wherein said using step, comprises the steps of:

calculating a remainder of said usable time; and displaying said remainder of said usable time.

3. The method of claim 2, wherein said managing step further comprises the steps of:

if said remainder of said usable time is less than zero, saving data of said main program in a storage; and deleting said key code of said main program in said personal computer.

4. The method of claim 1, wherein said loading step, comprises the steps of:

selecting one main program from a plurality of main programs stored in said recording medium connected to said personal computer; and loading said one main program from said recording medium to said personal computer.

* * * * *